United States Patent
Yoshii (10) Patent No.: US 7,312,842 B2
(45) Date of Patent: Dec. 25, 2007

(54) REFLECTOR AND LIQUID CRYSTAL DISPLAY DEVICE

(75) Inventor: Katsumasa Yoshii, Fukushima-ken (JP)

(73) Assignee: Alps Electric Co., Ltd., Tokyo (JP)

(*) Notice: Subject to any disclaimer, the term of this patent is extended or adjusted under 35 U.S.C. 154(b) by 281 days.

(21) Appl. No.: 11/092,275

(22) Filed: Mar. 29, 2005

(65) Prior Publication Data

US 2005/0219850 A1  Oct. 6, 2005

(30) Foreign Application Priority Data

Mar. 30, 2004 (JP) .............................. 2004-098182

(51) Int. Cl.
*G02F 1/1335* (2006.01)
(52) U.S. Cl. ..................................... 349/113; 349/114
(58) Field of Classification Search ................ 349/113, 349/114, 67
See application file for complete search history.

(56) References Cited

U.S. PATENT DOCUMENTS 6,429,919 B1  8/2002 Takatsuka et al.

2003/0025852 A1* 2/2003 Ishitake ....................... 349/62
2003/0038911 A1* 2/2003 Tanada et al. .............. 349/117

FOREIGN PATENT DOCUMENTS

EP  1 271 190  1/2003
EP  1 462 842  9/2004

* cited by examiner

*Primary Examiner*—David Nelms
*Assistant Examiner*—David Y. Chung
(74) *Attorney, Agent, or Firm*—Brinks Hofer Gilson & Lione (57) ABSTRACT

In a concave portion of a reflector of a liquid crystal display, a shape of an opening surface is approximately elliptical. A straight line parallel to a first section line passing through a deepest point of the concave portion along a long axis of the elliptical shape is formed in a portion of the elliptical shape. The concave portion has an asymmetrical shape with respect to the first section which becomes wide from the first section line passing through the deepest point toward a depth direction and has a symmetrical shape with respect to the second section which becomes wide from the second section line perpendicular to the first section line toward the depth direction. A maximum angle of inclination of the second section is larger than a maximum angle of inclination of the first section.

14 Claims, 5 Drawing Sheets

FIG. 9

REFLECTOR AND LIQUID CRYSTAL DISPLAY DEVICE

This application claims the benefit of priority to Japanese Patent Application No. 2004-098182 filed on Mar. 30, 2004, herein incorporated by reference.

BACKGROUND OF THE INVENTION

1. Field of the Invention

The present invention relates to a reflector having asymmetrical concave portions and a liquid crystal display device having the same. More particularly, it relates to a reflector in which a reflection characteristic is prevented from deteriorating even at a large transmissive opening and a liquid crystal display device having the same.

2. Description of the Related Art

In portable electronic devices such as portable phones or portable game devices, a reflection-type liquid crystal display device capable of decreasing the power consumption is provided as a display part, since the lifetime of battery largely affects the convenience of electronic devices. The reflection-type liquid crystal display devices are provided with a reflector for total-reflecting external light incident from a front surface or a reflector for reflecting the external light incident from the front surface and transmitting light emitted from a backlight. As such a reflector, there is known a reflector provided with a plurality of fine concave or convex portions to maximally increase the reflectance of the reflector (for example, see Japanese Unexamined Patent Application Publication No. 11-52110).

Among these reflectors, particularly, the reflector for reflecting the external light and transmitting the light emitted from the backlight is referred to as a transflective reflector. In the transflective reflector, openings for transmitting light emitted from an illumination device, such as a backlight, toward the liquid crystal display panel are formed in a portion of a metal thin film having a plurality of fine concave portions thereon, which are formed by either sandblasting or photolithography or both. Therefore, the liquid crystal display panel can be brightly illuminated by any light source such as the external light or the illuminating device.

However, in the above-mentioned conventional reflector, the shape of each of the concave or convex portions, particularly, the section shape is not controlled by the distribution state of angle of inclination, but the reflection characteristic forms a so-called Gaussian distribution, which is symmetrical with respect to the specular reflection angle in a narrow range. Accordingly, if the openings are formed in the transflective reflector, the reflectance of the wide viewing angle area is significantly deteriorated. Accordingly, there are problems in that the brightness decreases and the image angle becomes narrow, which result in lowering the viewing convenience.

SUMMARY OF THE INVENTION

The present invention has been made in consideration of the above-mentioned problems, and it is an object of the present invention to provide a reflector and a liquid crystal display device having the same, in which the reflectance of the reflector can be highly maintained even though openings are formed in a transflective reflector.

In order to achieve the above object, according to the present invention, there is provided a reflector having a plurality of concave portions formed on one surface of a base substrate, wherein, when a section passing through a deepest point of each of the concave portions is defined as a first section and a section orthogonal to the first section at the deepest point is defined as a second section, the concave portion has an asymmetrical shape with respect to the first section and has a symmetrical shape with respect to the second section, and an opening surface of the concave portion has an approximately elliptical shape with a long axis in a direction along the first section.

The opening surface of the concave portion may be formed such that a portion of the approximately elliptical shape includes an approximately straight line extending in the direction along the first section. Further, the concave portion may be formed such that a maximum angle of an inclination of the second section is larger than that of the first section.

It is preferable that the maximum angle of the inclination of the first section is set in a range of from 5° to 25° and the maximum angle of the inclination of the second section is set in a range of from 15° to 28°. Also, there is provided a liquid crystal display device having the reflector formed in such a manner, a pair of substrates, and a liquid crystal layer interposed therebetween.

According to the reflector of the present invention, by making the opening surface of the concave portion in the approximately elliptical shape with a long axis in the direction along the first section, the reflectance can be highly maintained, even though the reflector is formed with the transflective reflector and is provided with the openings for transmitting illumination light. Accordingly, when it is used as a reflector in a liquid crystal display device, a bright image display can be performed at a wide viewing angle.

DESCRIPTION OF THE PREFERRED EMBODIMENT

Figure 1:
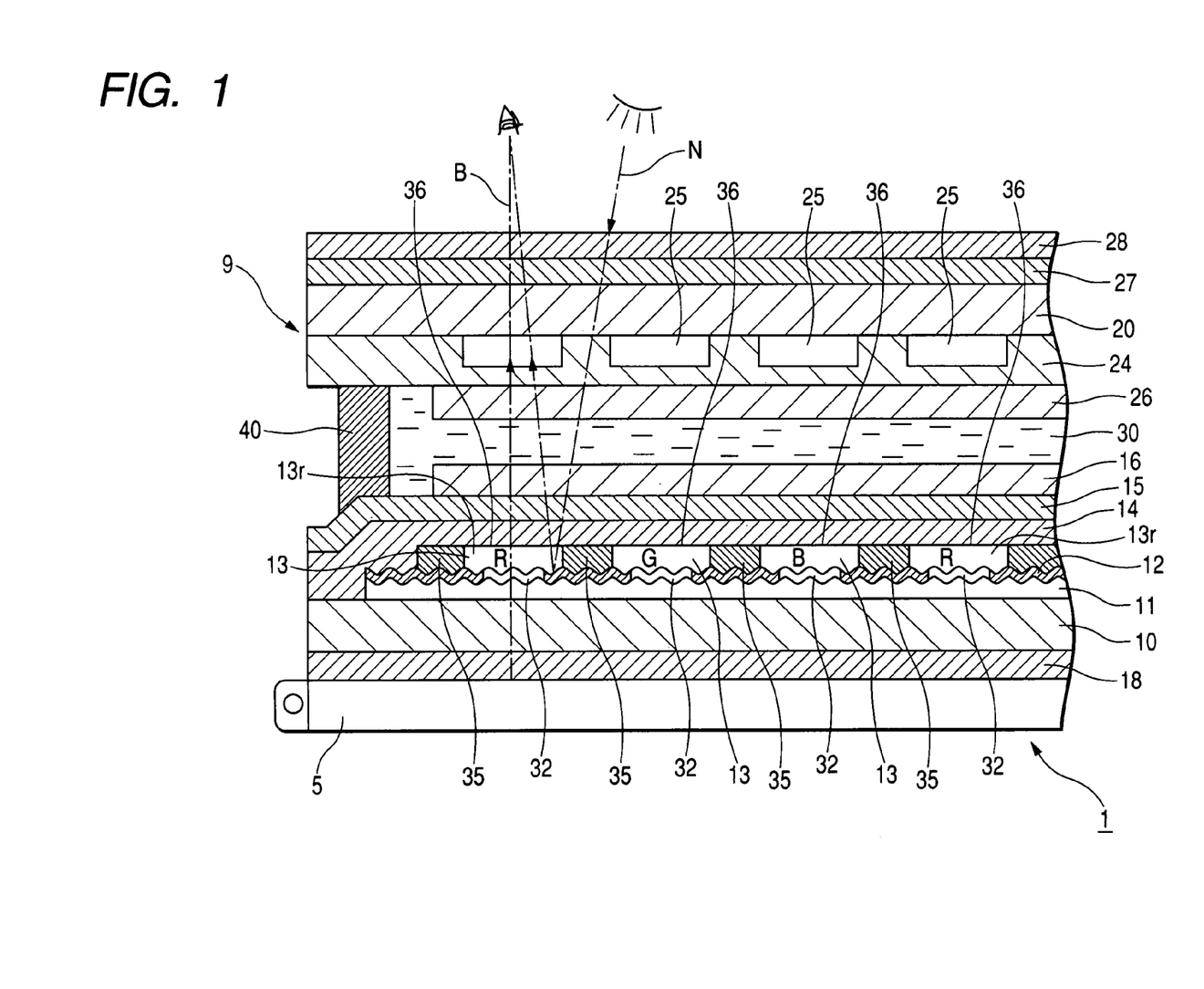
FIG. 1 is a cross sectional view showing a liquid crystal display device having a reflector according to the present invention.

Hereinafter, embodiments of the present invention will be described with reference to the accompanying drawings. FIG. 1 is an enlarged cross sectional view schematically showing a liquid crystal display device having a reflector according to the present invention. The liquid crystal display device 1 has a liquid crystal display panel 9 integrated by attaching a first substrate 10 and a second substrate 20 which are opposite to each other with a liquid crystal layer 30 therebetween and are composed of a transparent glass by sealing material 40 provided in a ring shape at the periphery of the substrates 10 and 20, and a backlight 5 which is an illuminating device.

At a side of the liquid crystal layer 30 of the first substrate 10, an organic film (base substrate) 11 for forming concave portions (dimples) 31 in a transflective reflective film (reflector) 12, the transflective reflective film (reflector) 12 for reflecting light incident on the liquid crystal display device 1 and transmitting the light emitted from the backlight 5, color filters 13 for displaying colors, an overcoat film 14 for protecting by covering the organic film 11 and the transflective reflective film 12 and making flat the irregularities generated by the organic film 11 or the color filters 13, an electrode layer 15 for driving the liquid crystal layer 30, an orientation film 16 for controlling the orientation of liquid crystal molecules constituting the liquid crystal layer 30 are laminated in this order. In addition, at a side of the liquid crystal layer 30 of the second substrate 20, an electrode layer 25, an overcoat film 24 and an orientation film 26 are sequentially laminated.

The color filters 13 are formed such that three colors of red, green and blue which are primary colors of light are repeated. In addition, light shielding walls 35 generally referred to as a black matrix are formed between the color filters 13 to prevent the colors from being mixed between the color filters 13. Respective regions divided by the light shielding walls 35 constitute respective pixel regions 36.

A polarization plate 18 is provided at a side opposite to the liquid crystal layer 30 of the first substrate 10 (an external side of the first substrate 10), a phase difference plate 27 and a polarization plate 28 are sequentially laminated at a side opposite to the liquid crystal layer 30 of the second substrate 20 (an external side of the second substrate 20). Also, at an external side of the polarization plate 18 of the first substrate 10, the backlight 5 is provided as an illuminating device for performing transmissive display of the liquid crystal display device 1.

The organic film (base substrate) 11 is provided to efficiently scatter reflected light by forming concave portions 31 in the transflective reflective film 12 formed thereon. Since external light incident on the liquid crystal display device 1 can be efficiently reflected by forming the concave portions 31 in the transflective reflective film 12, bright display can be accomplished upon illumination due to the external light reflection.

As a method for implementing the reflective film, a method of using a block made of a metal as a master blank, manufacturing an individual concave portion in the surface thereof while controlling the shape (depth, pitch and sectional shape) by a fine manufacturing tool corresponding to the above-mentioned sectional shape, and pressing the manufactured mold patterned from the obtained surface to form the shape is preferably employed.

The transflective reflective film 12 is, for example, formed of a metal thin film having a high reflectance such as aluminum. The transflective reflective film 12 is formed with openings 32 in correspondence with each pixel of the liquid crystal display panel 9. The opening 32 is to allow light irradiated from the backlight (illuminating device) 5 to transmit the transflective reflective film 12 made of the metal thin film.

By the above-mentioned structure, in the liquid crystal display device 1, if external light N is incident on the liquid crystal display panel 9 outdoors during the day, it is reflected at the reflecting region other than the opening 32 of the transflective reflective film 12 made of a metal thin film to brightly illuminate the liquid crystal display panel 9.

On the other hand, under an environment where the external light is lacking, such as at night or dark indoors, if the backlight 5 is turned on, the illumination light B irradiated from the backlight 5 is transmitted through the opening 32 of the transflective reflective film 12 to brightly illuminate the liquid crystal display panel 9. As such, the liquid crystal display device 1 can brightly illuminate the liquid crystal display panel 9 by operation of the transflective reflective film 12 even though any one of the external light and the backlight 5 is used as a light source.

Figure 2:
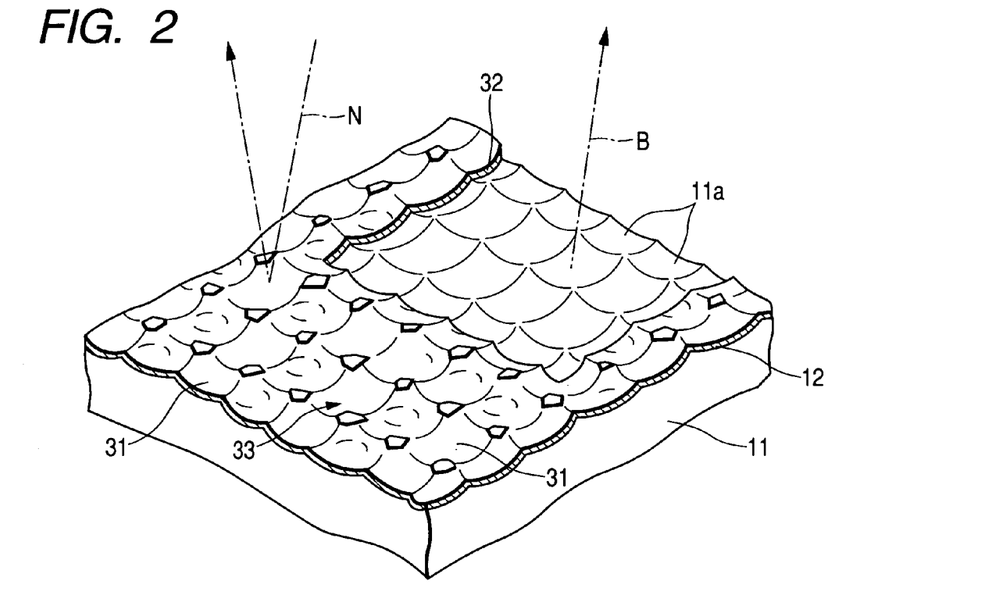
FIG. 2 is an enlarged perspective view of the reflector shown in FIG. 1.

FIG. 2 is a perspective view showing a portion including the organic film 11 and the transflective reflective film 12 formed thereon. As shown in the figure, a surface of the organic film 11 is successively formed with a plurality of concave portions 11a, an inner surface of each forming a portion of elliptical surface, and the transflective reflective film 12 is laminated thereon. By the concave portions 11a formed in the surface of the organic film 11, the concave portions 31 are formed in the transflective reflective film 12. Also, in case that the plurality of concave portions are formed so as to be overlapped in a horizontal or vertical direction, flat surface of the reflective film can be preferably decreased and bright reflection light can be preferably obtained at wide viewing angle.

In addition, a portion of the transflective reflective film 12 is formed with rectangular openings 32. The opening 32 may be formed by, for example, etching. By this structure, the transflective reflective film 12 transmits the illumination light B emitted from the backlight 5 to the opening 32 and efficiently reflects the external light N at reflection regions 33 formed with the concave portion 31.

Figure 3:
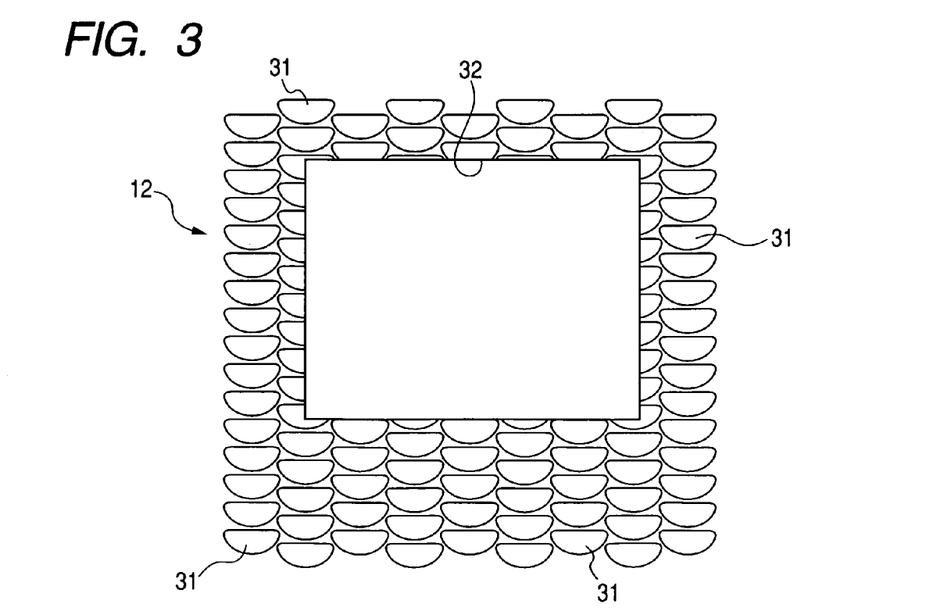
FIG. 3 is an enlarged plan view of a vicinity of an opening of the reflector shown in FIG. 1.

FIG. 3 is an enlarged plan view of the portion of the reflector according to the present invention. The transflective reflective film 12 is randomly formed with a plurality of the concave portions 31 each of whose opening shape is approximately an elliptical shape. Further, the opening 32 surrounding the concave portion 31 is formed. The openings 32 are, for example, formed in correspondence with each pixel of the liquid crystal display panel 9 (see FIG. 1).

Figure 4:
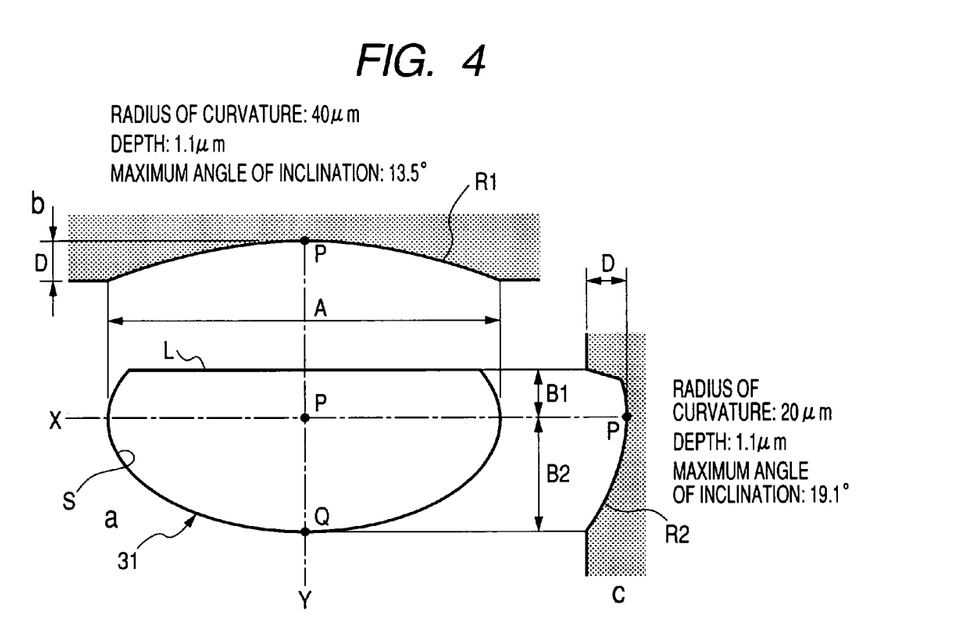
FIG. 4 is an enlarged three-side view of a concave portion constituting the reflector.

FIG. 4 is an enlarged three-side view of one concave portion. As shown by a in FIG. 4, the concave portion 31 is formed such that the shape of the opening surface S is approximately elliptical. Further, according to the present invention, in the shape of the opening surface S, an approximate straight line portion L parallel to a first section line X passing through the deepest point P (see a and b in FIG. 4) of the concave portion 31 along a long axis direction of an approximate ellipse may be formed in a portion of the approximate ellipse. As such, in case of forming the approximate straight line, an opening area of the concave portion can be reduced and the number of the concave portions formed in a region within a predetermined range can be increased in the reflective plate, and thus the bright reflection light can be preferably obtained at a wider viewing angle.

The concave portion 31 has an asymmetrical shape with respect to the first section (see b in FIG. 4) which becomes wide from the first section line X passing through the deepest point P toward a depth direction and has a symmetrical shape with respect to the second section (see c in FIG. 4) which becomes wide from the second section line Y perpendicular to the first section line X toward the depth direction.

In addition, the concave portion 31 is set such that the maximum angle of inclination R2 of the second section shown by c in FIG. 4 is larger than the maximum angle of inclination R1 of the first section shown by b in FIG. 4. For example, it is preferable that the maximum angle of inclination R1 of the first section is in a range of 5° to 25° and, for example, it is set to 13.5°. Also, it is preferable that the maximum angle of inclination R2 of the second section is in a range of 15° to 28° and, for example, it is set to 19.1°. Further, a radius of curvature of the first section of the concave portion 31 is set to, for example, 40 µm and a radius of curvature of the second section thereof is set to, for example, 20 µm.

If the maximum angle of inclination R1 of the first section is larger than 25°, the shape of the concave portion becomes close to a sphere from the ellipse, and thus it is difficult to significantly improve a reflection strength in a viewer direction. Also, if it is smaller than 5°, the sufficient brightness is obtained with respect to light incident from a front side, but there is a problem in that a rainbow caused by dispersion of the light is generated because the ellipticity is large. In addition, if the maximum angle of inclination R2 of the second section is larger than 28°, it gives a dark impression to the viewer, and, if it is smaller than 15°, the reflection strength in a vicinity of the front side (light receiving angle 0°) is reduced, and thus also give a dark impression.

The depth D of the concave portion 31 from the opening surface S of the concave portion 31 to the deepest point P is set to, for example, 1.1 µm. Further, the width A in the first section line X direction of the concave portion 31 is set to, for example, 18.6 µm. The width B1 from the straight line L to the first section line X in the second section line Y direction of the concave portion 31 is set to, for example, 2.0 µm, and the width B2 from the first section line X to the top Q of the approximately elliptical shape of the opening surface S is set to, for example, 6.5 µm.

In the approximately elliptical shape which is the shape of the opening surface of the concave portion, a ratio of a radius α of the long axis along the first section line X direction to a radius β of the short axis along the second section line Y direction (α/β: aspect ratio) is preferably in a range of 1.1 to 1.8, and is more preferably in a range 1.2 to 1.7.

If the aspect ratio is smaller than 1.1, the concave portion has a shape close to a sphere. Accordingly, when seeing the reflective plate in a plan view, it is difficult to obtain a desired reflection characteristic in a wide range with respect to a vertical direction. Further, if the aspect ratio is larger than 1.8, the desired reflection characteristic in the vertical direction is obtained, but it is difficult to obtain the desired reflection characteristic in a wide range with respect to a horizontal direction.

It is preferable that the plurality of the concave portions formed in the reflective plate are formed such that the approximate straight line portion L parallel to the first section line X is arranged in a direction far from a viewing point of the viewer.

Therefore, in case of using the reflective plate according to the present invention in the liquid crystal display device, the amount of reflected light in a range of 20° from a direction of a normal line for display surface of the liquid crystal display device is increased, the amount of reflected light is increased as it gets closer to the viewing point of the viewer, and a region where the amount of reflected light is high is wider. Accordingly, the liquid crystal display device, which can perform bright display in a practical point of view, particularly, within a range in which an angle formed by the normal line direction and a primary viewing direction is 0° to 20°, can be implemented.

By forming the concave portion 31 in the above-mentioned shape, it is possible to highly maintain the reflectance, although the reflector is formed of the transflective reflective film 12 and the openings 32 for transmitting the illumination light are provided. Therefore, in case of using the reflector in the liquid crystal display device, a bright image can be displayed at a wide viewing angle.

First Embodiment

Figure 5:
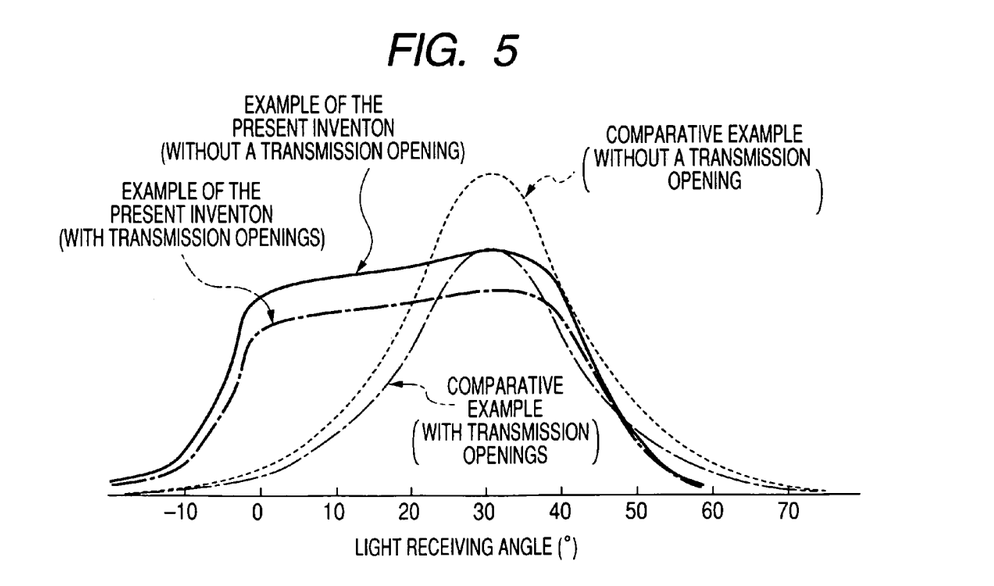
FIG. 5 is a graph showing a verified result of the reflector according to the prevent invention.

The present applicant verified the reflection characteristic of the reflector according to the above-mentioned prevent invention. In the verification, two reflectors formed with a plurality of concave portions each of which opening shape is approximately elliptical as shown in FIG. 4 are prepared, and one of the reflectors is formed with transmissive openings with an area ratio of 30% and the other thereof is not formed with the transmissive openings (total reflection). Further, two reflectors formed with a plurality of conventional concave portions each of which opening shape is approximately circular are prepared as a comparative example, and one of the reflectors is formed with the transmissive openings with an area ratio of 30% and the other thereof is not formed with the transmissive openings (total reflection). FIG. 5 shows the verified results of the reflection characteristics of the reflectors of the present invention and the comparative example.

In addition, the reflection characteristic of the reflector shows a relationship between the brightness (reflectance) and the light receiving angle (°), when external light is irradiated toward the reflection surface by the incidence angle 30° (angle formed by an optical axis of external light illuminated from an opposite side of a viewing point of a viewer who views it from one side of a perpendicular line (normal line) of a reflection surface) and turning the viewing direction (the light receiving angle) from a perpendicular location (the normal location) (0°) to 70°.

As shown in FIG. 5, in the reflector according to the present invention of which opening shape is approximately elliptical, it has been verified that high reflection strength can be obtained in a wide range where the light receiving angle is 0° to 50° regardless of whether or not the reflector has the transmissive openings. On the other hand, in the reflector according to the present invention of which opening shape is approximately circular, so-called Gaussian distribution type reflection strength is obtained regardless of whether or not the reflector has the transmissive openings, so that the high reflection strength can be obtained only in a narrow range where the light receiving angle is 20° to 40°. Further, within this range, there was a rapid change of the reflection strength due to variation of the light receiving angle. From the verified result, if the reflector according to the present invention is used as the reflector of the liquid crystal display device, it has been confirmed that a bright image can be displayed at a wide viewing angle.

Second Embodiment

Figure 6:
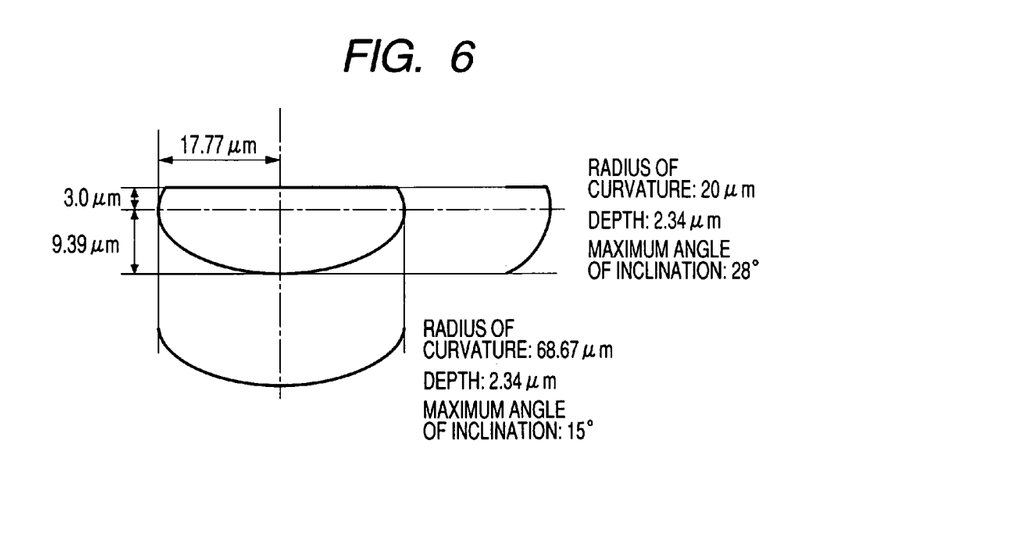
FIG. 6 is another enlarged three-side view of the concave portion constituting the reflector.
Figure 7:
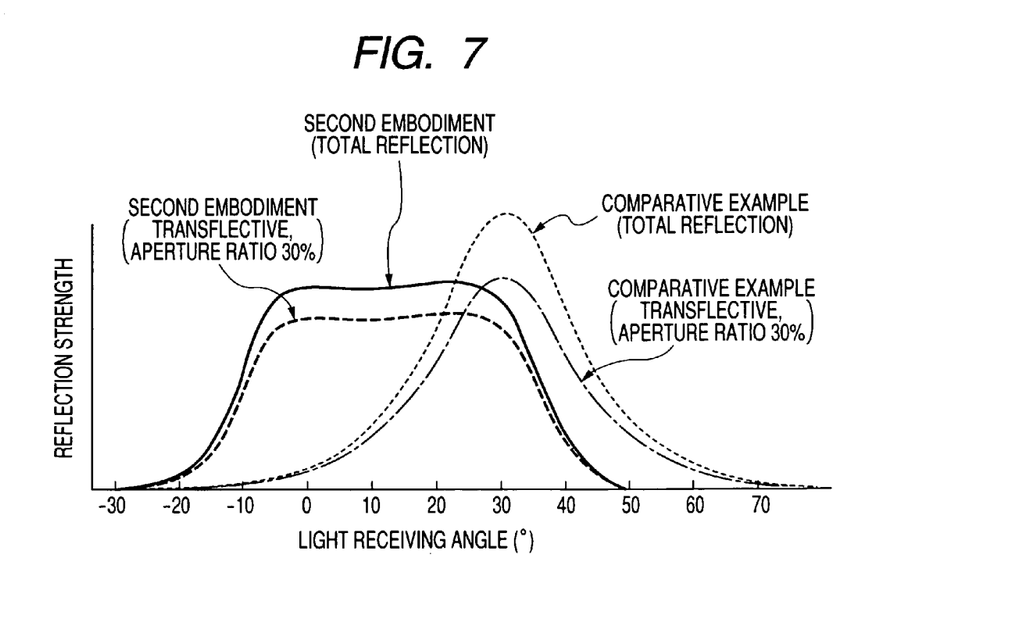
FIG. 7 is a graph showing a verified result of the reflector according to the prevent invention.

The present applicant verified the reflection characteristic of the reflector according to the present invention. In the verification, two reflectors formed with a plurality of concave portions each of which opening shape is approximately elliptical, as shown in the three-side view of FIG. 6, are prepared, and one of the reflectors is formed with transmissive openings with an area ratio of 30% and the other thereof is not formed with the transmissive openings (total reflection). The radius of curvature, the depth and the maximum angle of inclination of each portion of the concave portion are indicated in the Figure. Further, two reflectors formed with a plurality of conventional concave portions each of which opening shape is approximately circular are prepared as a comparative example, and one of the reflectors is formed with the transmissive openings with an area ratio of 30% and the other thereof is not formed with the transmissive openings (total reflection). FIG. 7 shows the verified results of the reflection characteristics of the reflectors of the present invention and the comparative example.

As shown FIG. 7, in the reflector according to the present invention of which opening shape is approximately elliptical, it has been verified that high reflection strength can be obtained in a wide range where the light receiving angle is −10° to 30° regardless of whether or not the reflector has the transmissive openings. On the other hand, in the reflector according to the present invention of which opening shape is approximately circular, so-called Gaussian distribution type reflection strength is obtained regardless of whether or not the reflector has the transmissive openings, so that the high reflection strength can be obtained only in a narrow range where the light receiving angle is approximately 30°. Further, even in the narrow range of approximately 30°, there was a rapid change in the reflection strength due to variation of the light receiving angle. From the verified result, if the reflector according to the present invention is used as the reflector of the liquid crystal display device, it has been confirmed that a bright image can be displayed at a wide viewing angle.

Third Embodiment

Figure 8:
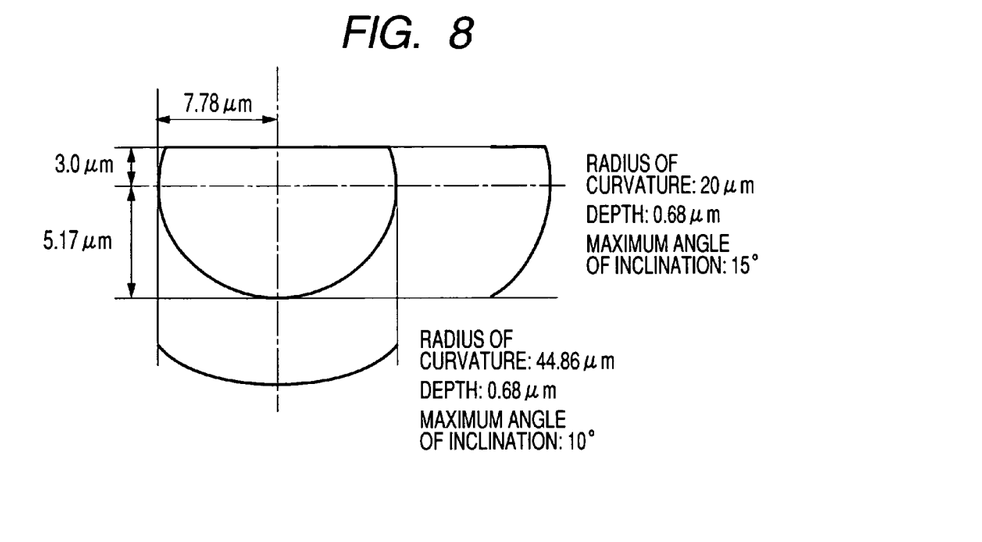
FIG. 8 is another enlarged three-side view of the concave portion constituting the reflector.
Figure 9:
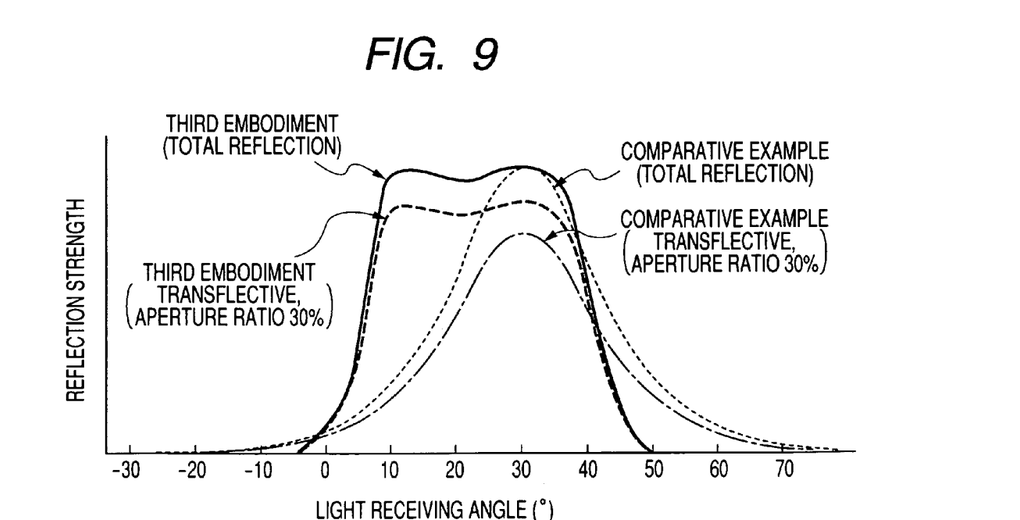
FIG. 9 is a graph showing a verified result of the reflector according to the prevent invention.

The present applicant verified the reflection characteristic of the reflector according to the present invention. In the verification, two reflectors formed with a plurality of concave portions each of which opening shape is approximately elliptical, as shown in the three-side view of FIG. 8, are prepared, and one of the reflectors is formed with transmissive openings with an area ratio of 30% and the other thereof is not formed with the transmissive openings (total reflection). The radius of curvature, the depth and the maximum angle of inclination of each portion of the concave portion are indicated in the Figure. Further, two reflectors formed with a plurality of conventional concave portions each of which opening shape is approximately circular are prepared as a comparative example, and one of the reflectors is formed with the transmissive openings with an area ratio of 30% and the other thereof is not formed with the transmissive openings (total reflection). FIG. 9 shows the verified results of the reflection characteristics of the reflectors of the present invention and the comparative example.

As shown in FIG. 9, in the reflector according to the present invention of which opening shape is approximately elliptical, it has been verified that high reflection strength can be obtained in a wide range where the light receiving angle is 10° to 40° regardless of whether or not the reflector has the transmissive openings. On the other hand, in the reflector according to the present invention of which opening shape is approximately circular, so-called Gaussian distribution type reflection strength is obtained regardless of whether or not the reflector has the transmissive openings, so that the high reflection strength can be obtained only in a narrow range where the light receiving angle is approximately 30°. Further, even in the narrow range of approximately 30°, there was a rapid change in the reflection strength due to variation of the light receiving angle. From the verified result, if the reflector according to the present invention is used as the reflector of the liquid crystal display device, it has been confirmed that a bright image can be displayed at a wide viewing angle.

What is claimed is:

1. A reflector comprising a plurality of concave portions formed on one surface of a base substrate,
wherein, when a section passing though a deepest point of each of the concave portions is defined as a first section, and a section orthogonal to the first section at the deepest point is defined as a second section, the concave portion has an asymmetrical shape with respect to the first section and has a symmetrical shape with respect to the second section, and
wherein an opening surface of the concave portion has an approximately elliptical shape with a long axis in a direction along the first section and a maximum inclination angle of the second section is set larger than a maximum inclination angle of the first section to provide high reflection intensity in a wide angular range of received incident light.

2. The reflector according to claim 1,
wherein the concave portion is formed such that a maximum angle of an inclination of the second section is larger than that of the first section.

3. The reflector according to claim 1,
wherein a maximum angle of the inclination of the first section is set in a range of from 5° to 25° and a maximum angle of the inclination of the second section is set in a range of from 15° to 28°.

4. The reflector according to claim 1,
wherein a ratio of a radius α of the long axis along the first section to a radius β of a short axis along the second section (α/β: aspect ratio) in the approximately elliptical shape is set in a range of from 1.1 to 1.8.

5. The reflector according to claim 1,
wherein a ratio of a radius a of the long axis along the first section to a radius β of a short axis along the second section (α/β: aspect ratio) in the approximately elliptical shape is set in a range of from 1.2 to 1.7.

6. The reflector according to claim 1,
wherein the opening surface of the concave portion is formed such that a portion of the approximately elliptical shape includes an approximately straight line extending in the direction along the first section.

7. A liquid crystal display device having:
the reflector according to claim 1;
a pair of substrates; and
a liquid crystal layer interposed between the substrates.

8. A liquid crystal display device having:
the reflector according to claim 2;
a pair of substrates; and
a liquid crystal layer interposed between the substrates.

9. A liquid crystal display device having:
the reflector according to claim 3;
a pair of substrates; and
a liquid crystal layer interposed between the substrates.

10. A liquid crystal display device having:
the reflector according to claim 4;
a pair of substrates; and
a liquid crystal layer interposed between the substrates.

11. A liquid crystal display device having:
the reflector according to claim 5;
a pair of substrates; and
a liquid crystal layer interposed between the substrates.

12. A liquid crystal display device having:
the reflector according to claim 6;
a pair of substrates; and
a liquid crystal layer interposed between the substrates.

13. The reflector according to claim 1, wherein the angle of the received incident light is in the range of −10 degrees to fifty degrees.

14. The reflector according to claim 1, wherein the concave portion is arranged so that the first section is directed in a horizontal direction when viewed from an observer side.

* * * * *

UNITED STATES PATENT AND TRADEMARK OFFICE
CERTIFICATE OF CORRECTION

| | | |
|---|---|---|
| PATENT NO. | : 7,312,842 B2 | Page 1 of 1 |
| APPLICATION NO. | : 11/092275 | |
| DATED | : December 25, 2007 | |
| INVENTOR(S) | : Katsumasa Yoshii | |

It is certified that error appears in the above-identified patent and that said Letters Patent is hereby corrected as shown below:

Column 8, in claim 5, line 2, after "ratio of a radius" delete "a" and substitute --α-- in its place.

Signed and Sealed this

Twenty-seventh Day of May, 2008

JON W. DUDAS
*Director of the United States Patent and Trademark Office*